US011048266B2

United States Patent
Jeon

(10) Patent No.: US 11,048,266 B2
(45) Date of Patent: Jun. 29, 2021

(54) METHOD AND APPARATUS FOR RECOGNIZING OBJECT

(71) Applicant: Samsung Electronics Co., Ltd., Suwon-si (KR)

(72) Inventor: PaulBarom Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 15/992,447

(22) Filed: May 30, 2018

(65) Prior Publication Data

US 2019/0072977 A1 Mar. 7, 2019

(30) Foreign Application Priority Data

Sep. 4, 2017 (KR) ........................ 10-2017-0112429

(51) Int. Cl.
*G05D 1/02* (2020.01)
*G06K 9/32* (2006.01)
(Continued)

(52) U.S. Cl.
CPC ......... *G05D 1/0246* (2013.01); *G05D 1/0223* (2013.01); *G06K 9/00791* (2013.01);
(Continued)

(58) Field of Classification Search
CPC ...... G08G 1/16; G08G 1/166; G06K 2209/23; G06K 9/00812; G06K 9/00805;
(Continued)

(56) References Cited

U.S. PATENT DOCUMENTS 6,990,253 B2 1/2006 Takeda et al.
7,660,437 B2 * 2/2010 Breed ................ G06K 9/00832
382/104
(Continued)

FOREIGN PATENT DOCUMENTS

CN 106384345 A 2/2017
JP 3285575 B2 5/2002
(Continued)

OTHER PUBLICATIONS

Kong, Tao et al., "HyperNet: Towards Accurate Region Proposal Generation and Joint Object Detection", *2016 IEEE Conference on Computer Vision and Pattern Recognition (CVPR)*, Apr. 3, 2016, (pp. 845-853).
(Continued)

*Primary Examiner* — Anthony R Jimenez
(74) *Attorney, Agent, or Firm* — NSIP Law

(57) ABSTRACT

A method and apparatus for recognizing an object are provided, the method including extracting a feature from an input image and generating a feature map in a neural network. In parallel with the generating of the feature map, a region of interest (ROI) corresponding to an object of interest is extracted from the input image, and a number of object candidate regions used to detect the object of interest is determined based on a size of the ROI. The object of interest is recognized from the ROI based on the number of object candidate regions in the neural network.

23 Claims, 7 Drawing Sheets

(51) Int. Cl.
*G06K 9/00* (2006.01)
*G06T 7/11* (2017.01)
*G06K 9/62* (2006.01)

(52) U.S. Cl.
CPC ......... *G06K 9/3233* (2013.01); *G06K 9/3241* (2013.01); *G06K 9/6261* (2013.01); *G06K 9/6268* (2013.01); *G06K 9/6296* (2013.01); *G06T 7/11* (2017.01); *G06K 9/00805* (2013.01); *G06T 2207/20084* (2013.01); *G06T 2207/30261* (2013.01)

(58) Field of Classification Search
CPC ............ G06K 9/3241; G06K 9/00979; G06K 9/4671; G06K 9/42; G06K 9/4628; G06K 9/66; G06K 9/00; G06K 9/48; G06K 9/32; G06K 9/62; B60W 30/08; B60W 30/06; G06T 7/70; G06T 7/0002; G06T 7/10; G06T 7/11; G06T 7/12; G06T 7/13; G06T 7/136; G06T 7/143; G06T 7/174; G06T 7/181; G06T 7/194; G06T 7/20; G06T 7/207; G06T 7/215; G06T 7/223; G06T 7/269; G06T 7/30; G06T 7/32; G06T 7/33; G06T 7/40; G06T 7/50; G06T 7/55; G06T 7/60; G06T 7/62; G06T 7/66; G06T 7/73; G06T 7/75; G06T 7/77; G06T 7/80; G06T 7/85; G06T 7/97; G06T 1/00; G06T 1/0007; G06T 1/20; G06T 1/40; G06T 1/403; G06T 1/4046; G06N 3/04; G06N 3/00; G06N 3/02; G06N 3/0436; G06N 3/063; G06N 3/067; G06N 3/0675; G06N 3/08; G06N 7/00; G06N 7/026; G06N 7/04; G06N 7/046; B62D 15/027; G05D 3/00; G05D 3/12; G05D 3/14; G05D 2201/00; G05D 2201/02; G05D 1/02; H04N 5/23212
USPC ................................. 701/41; 382/104, 199
See application file for complete search history.

(56) References Cited

U.S. PATENT DOCUMENTS

| | | | |
|---|---|---|---|
| 9,085,236 | B2* | 7/2015 | Schwindt ........... B60K 31/0008 |
| 9,435,887 | B2 | 9/2016 | Kim et al. |
| 10,713,794 | B1* | 7/2020 | He .............................. G06T 7/11 |
| 2008/0069402 | A1* | 3/2008 | Dhua ................... G06K 9/3241 382/104 |
| 2016/0210513 | A1 | 7/2016 | Wang et al. |
| 2017/0124409 | A1* | 5/2017 | Choi ..................... G06N 3/0454 |
| 2018/0012411 | A1* | 1/2018 | Richey .................. G06T 19/006 |
| 2018/0075290 | A1* | 3/2018 | Chen ................... G06K 9/00248 |
| 2018/0186368 | A1* | 7/2018 | Kim .......................... B60T 7/22 |

FOREIGN PATENT DOCUMENTS

| | | |
|---|---|---|
| JP | 4528320 B2 | 8/2010 |
| JP | 4587038 B2 | 11/2010 |
| KR | 10-0416252 B1 | 1/2004 |
| KR | 10-2007-0019347 A | 2/2007 |
| KR | 10-1264282 B1 | 5/2013 |
| KR | 10-1551904 B1 | 9/2015 |
| KR | 1091632198 B1 | 7/2016 |

OTHER PUBLICATIONS

Extended European Search Report dated Jan. 18, 2019 in counterpart European Patent Application No. 18187277.1 (7 pages in English).

Han, DongHee., "Traffic light detection and recognition for autonomous vehicles based on region of interest using digital map and color", *Kookmin University*, Dec. 15, 2016 (1 pages in English and 84 pages in Chinese).

Lee, Dongsuk et al., "Real-Time License Plate Detection Based on Faster R-CNN", *KIPS TR. Software and Data Eng.*, vol. 5, No. 11, 2016 (pp. 511-520).

Kim, Byoung-Jun., "License Plate Detection System Using Faster R-CNN method for Outdoor Images" *Division of Electronics and Information Engineering, Chonbuk National University*, Feb. 22, 2017 (3 Pages in English and 61 pages in Korean).

\* cited by examiner

METHOD AND APPARATUS FOR RECOGNIZING OBJECT

CROSS-REFERENCE TO RELATED APPLICATIONS

This application claims the benefit under 35 USC § 119(a) of Korean Patent Application No. 10-2017-0112429, filed on Sep. 4, 2017, in the Korean Intellectual Property Office, the entire disclosure of which is incorporated herein by reference for all purposes.

BACKGROUND

1. Field

The following description relates to a method and apparatus for recognizing an object.

2. Description of Related Art

Autonomous driving of a vehicle enables various driving operations to be automatically performed. For example, an autonomous host vehicle independently travels on a road without a driver operating the vehicle through a steering wheel, an accelerator pedal, or a brake. An object recognition for autonomous driving is performed based on image information analyzed in a vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object recognition method including extracting, in a neural network, a feature from an input image and generating a feature map, extracting, in parallel with the generating of the feature map, a region of interest (ROI) corresponding to an object of interest from the input image, determining, a number of object candidate regions used to detect the object of interest based on a size of the ROI, and recognizing the object of interest from the ROI based on the number of object candidate regions in the neural network.

The object of interest may include any one or any combination of a road, a vehicle, a human, an animal, a plant, and a building.

The extracting of the ROI may include determining the number of object candidate regions based on the size of the ROI and a size of the input image.

The extracting of the ROI may include calculating a ratio of the size of the ROI to the size of the input image, and determining the number of object candidate regions based on the ratio.

The recognizing of the object of interest may include determining positions of the object candidate regions on the feature map, and recognizing the object of interest from the ROI based on the positions of the object candidate regions.

The extracting of the ROI may include extracting the ROI based on any one or any combination of a training-based scene segmentation algorithm and an image processing algorithm.

The neural network may include a region-based convolutional neural network (R-CNN) including a region proposal network (RPN) and a detection network.

The object recognition method may include determining a control parameter to control a speed of a vehicle and a traveling direction of the vehicle based on a result of the recognizing, and controlling a movement of the vehicle using the control parameter.

The determining of the number of the object candidate regions may include calculating a ratio of the size of the ROI to a size of the input image, and determining the number of object candidate regions based on applying a number of default object candidate regions for the neural network to the ratio.

The ROI may include a region corresponding to one or any combination of a road, a vehicle, a human, an animal, a plant, and a building.

In another general aspect, there is provided an object recognition method including extracting a region of interest (ROI) corresponding to an object of interest from an input image, determining, based on a size of the ROI, a number of object candidate regions used to detect the object of interest, and recognizing, in a neural network, the object of interest from the ROI based on the number of object candidate regions.

The object of interest may include any one or any combination of a road, a vehicle, a human, an animal, a plant and a building.

The determining of the number of object candidate regions may include determining the number of object candidate regions based on the size of the ROI and a size of the input image.

The determining of the number of object candidate regions may include calculating a ratio of the size of the ROI to the size of the input image, and determining the number of object candidate regions based on the ratio.

The recognizing of the object of interest may include determining positions of the object candidate regions on a feature map generated in the neural network, based on the number of object candidate regions, and recognizing the object of interest from the ROI based on the positions of the object candidate regions.

The extracting of the ROI may include extracting the ROI based on any one or any combination of a training-based scene segmentation algorithm and an image processing algorithm.

The neural network may include a region-based convolutional neural network (R-CNN) including a region proposal network (RPN) and a detection network.

The object recognition method may include determining a control parameter used to control a speed of a vehicle and a traveling direction of the vehicle based on a result of the recognizing, and controlling a movement of the vehicle using the control parameter.

In another general aspect, there is provided an object recognition apparatus including a sensor configured to acquire an input image, a neural network, comprising a plurality of layers, configured to extract a feature from the input image and to generate a feature map, and a processor configured to extract, in parallel with a generation of the feature map, a region of interest (ROI) corresponding to an object of interest from the input image, and to determine, based on a size of the ROI, a number of object candidate regions used to detect the object of interest, wherein the neural network is further configured to recognize the object of interest from the ROI based on the number of object candidate regions.

The processor may be to calculate a ratio of the size of the ROI to a size of the input image and to determine the number of object candidate regions based on the ratio.

In another general aspect, there is provided an object recognition apparatus including a sensor configured to acquire an input image, a processor configured to extract a region of interest (ROI) corresponding an object of interest from the input image and to determine, based on a size of the ROI, a number of object candidate regions used to detect the object of interest, and a neural network, including a plurality of layers, configured to recognize the object of interest from the ROI based on the number of object candidate regions.

In another general aspect, there is provided an object recognition apparatus including a sensor configured to capture an image, and a processor configured to extract a region of interest (ROI) corresponding to an object of interest from the image, calculate a ratio of a size of the ROI to a size of the image, determine a number of object candidate regions used to detect the object of interest based on the ratio, and a neural network configured to extract a feature from the image and to generate a feature map, and recognize the object of interest from the ROI based on the number of object candidate regions and the feature map.

The processor may be configured to determine a control parameter to control a speed of the vehicle and a traveling direction of the vehicle based on the recognized object. Other features and aspects will be apparent from the following detailed description, the drawings, and the claims.

Figure 1:
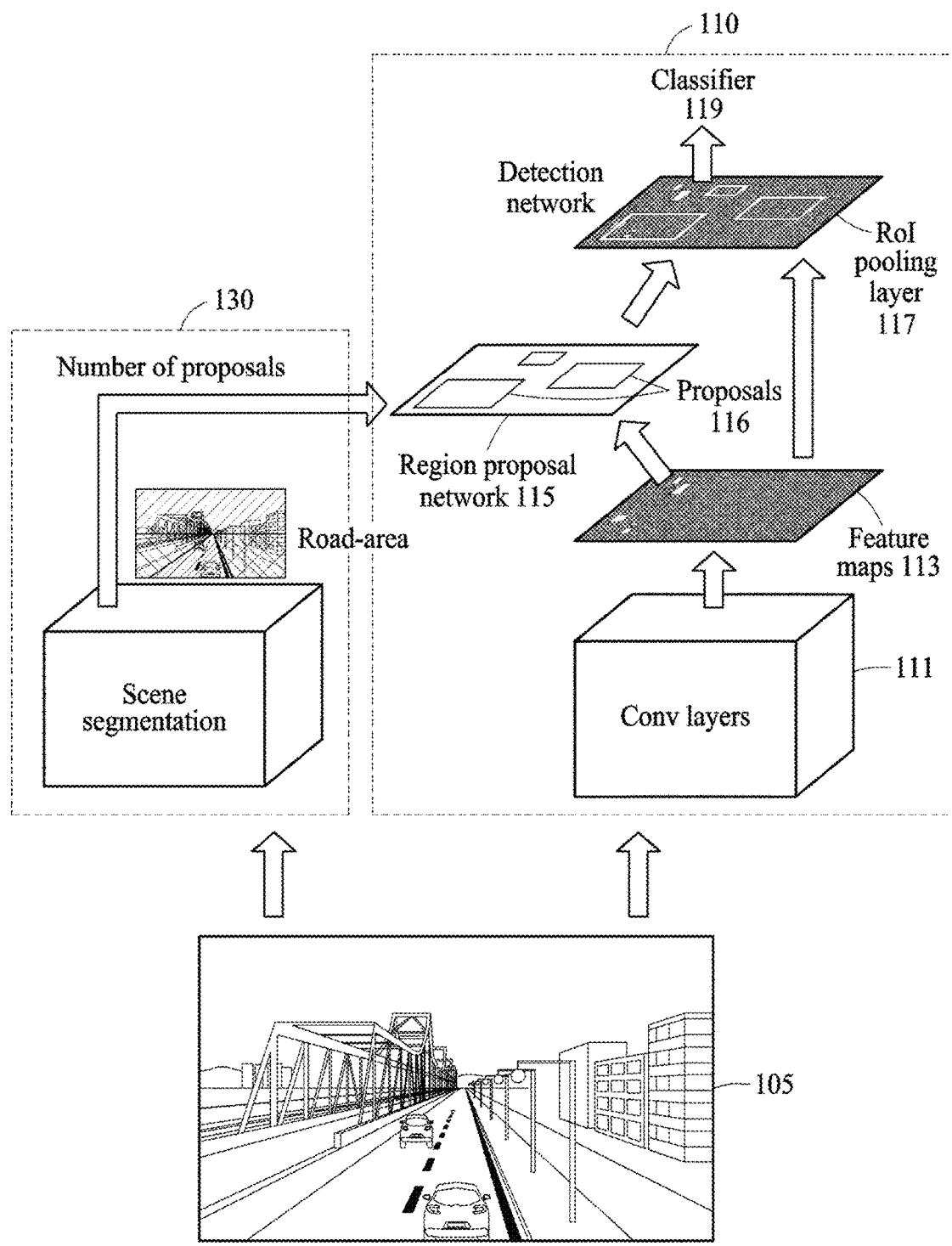
FIG. 1 is a diagram illustrating an example of a network architecture of an object recognition apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise.

In an example, the object recognition method and apparatuses is implemented in various types of products, such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, personal computers (PC), laptop computers, tablet computers, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, a portable lab-top PC, a global positioning system (GPS) navigation, a personal navigation device, portable navigation device (PND), a handheld game console, an e-book, televisions (TVs), a high definition television (HDTV), a smart appliance, a smart home appliances, an intelligent vehicles, kiosks, a biometrics-based door lock, a security device, a financial service device, communication systems, image processing systems, graphics processing systems, various Internet of Things (IoT) devices that are controlled through a network, a smart vehicle, other consumer electronics/information technology (CE/IT) device, or any other device capable of wireless communication or network communication consistent with that disclosed herein.

The examples may be applied to image processing to recognize an object using a smartphone, a mobile device, a smart home system, an intelligent vehicle, and an automated teller machine (ATM).

In an example, the object recognition apparatus described herein may be incorporated in a vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device. Also, examples may be used to provide information for autonomous driving of an intelligent vehicle by recognizing an object and control an autonomous vehicle. In an example, the object recognition apparatus is applicable to a robot requiring a positioning operation. Hereinafter, examples will be described in detail with reference to the accompanying drawings, and like reference numerals in the drawings refer to like elements throughout.

The apparatus and methods described herein may be used to recognize an object in a navigation system of a smart vehicle, to generate location information to assist an autonomous or automated driving vehicle in steering, for in-vehicle driving assistance for fully autonomous or automated driving, and thus, enable safer and more comfortable driving.

FIG. 1 illustrates an example of a network architecture of an object recognition apparatus 100. Referring to FIG. 1, the object recognition apparatus 100 includes a faster region-based convolutional neural network (R-CNN) 110 and a processor 130.

In an example, the faster R-CNN 110 receives all regions of an input image 105 and processes object candidate regions corresponding to the input image 105 at once. The faster R-CNN 110 extracts features from all the regions of the input image 105 at once through max-pooling in a CNN 111 including a plurality of convolutional (cony) layers, and generates a feature map 113. In an example, a feature map 113, or a plurality of feature maps 113 may be provided. The feature map 113 is, for example, a Conv5 feature map.

The faster R-CNN 110 obtains candidate regions with a high probability that an object of interest exists, i.e., obtains proposals 116 from the feature map 113 using a region proposal network (RPN) 115. In the following description, the proposals 116 are referred to as "object candidate regions." A configuration of the RPN 115 will be described in detail below with reference to FIG. 2.

In an example, the faster R-CNN 110 provides the object candidate regions obtained using the RPN 115 to an ROI, (i.e. region of interest), pooling layer 117. In an example, the faster R-CNN 110 extracts fixed-length feature vectors from feature maps 113 through the ROI pooling layer 117. In an example, the extracted fixed-length feature vectors are applied to a fully-connected (FC) layer (not shown). In an example, the faster R-CNN 110 includes a classifier 119 configured to estimate an object class and a background, and a bounding box regressor (not shown) configured to output a position of each object class. The classifier 119 is, for example, a softmax classifier. In an example, the ROI pooling layer 117 and the classifier 119 correspond to a detection network configured to recognize an object. The classifier 119 and the bounding box regressor are connected to a rear end of the FC layer.

The faster R-CNN 110 performs a convolution operation with respect to all the regions of the input image 105 only once by the CNN 111, and shares a result of the convolution operation in the faster R-CNN 110. The ROI pooling layer 117 adjusts a size so that various object candidate regions are input to the FC layer.

Generally, an inference time used to infer an object in the faster R-CNN 110 is approximately expressed using an equation "Inference Time≈1×ConvTime+Num of Proposals×fcTime." In the equation, ConvTime denotes a time used to perform a convolution operation in the CNN 111, and fcTime denotes a time used in an FC layer. An inference time of the faster R-CNN 110 is proportional to a number of proposals, i.e., a number of object candidate regions.

The object recognition apparatus 100 reduces a number of object candidate regions, which has a significant influence on the inference time in the faster R-CNN 110 in proportion to an area of a region of interest (ROI) and thus, reducing the inference time.

The object recognition apparatus 100 improves the object recognition speed for example, by quickly extracting a road region in which a vehicle travels from the input image 105, and performing an object recognition with respect to the road region. In an example, the object recognition apparatus 100 sets the extracted road region as an ROI, resets a number of object candidate regions used in the faster R-CNN 110 to be suitable for a size of the ROI, and performs the object recognition, to effectively enhance the object recognition speed. In an example, the road region set as the ROI is extracted using a scene segmentation algorithm performed by the processor 130. The processor 130 determines a number of object candidate regions based on the size of the ROI and provides the number of object candidate regions to the RPN 115. In an example, the above operation of the processor 130 and an operation of generating the feature map 113 in the faster R-CNN 110 are performed in parallel or sequentially.

In an example, when the operation of the faster R-CNN 110 and the operation of the processor 130 are performed in parallel, an additional amount of time to extract the ROI and determine the number of object candidate regions is not calculated.

In another example, the processor 130 extracts an ROI at a relatively high speed within 10 milliseconds (ms) using various ROI extraction schemes that are based on a computer vision algorithm, and operates sequentially with the faster R-CNN 110.

Hereinafter, an example in which the operation of the faster R-CNN 110 and the operation of the processor 130 are performed in parallel will be described below with reference to FIGS. 3 and 4, and an example in which the operation of the faster R-CNN 110 and the operation of the processor 130 are sequentially performed will be described below with reference to FIGS. 5 and 6.

Figure 2:
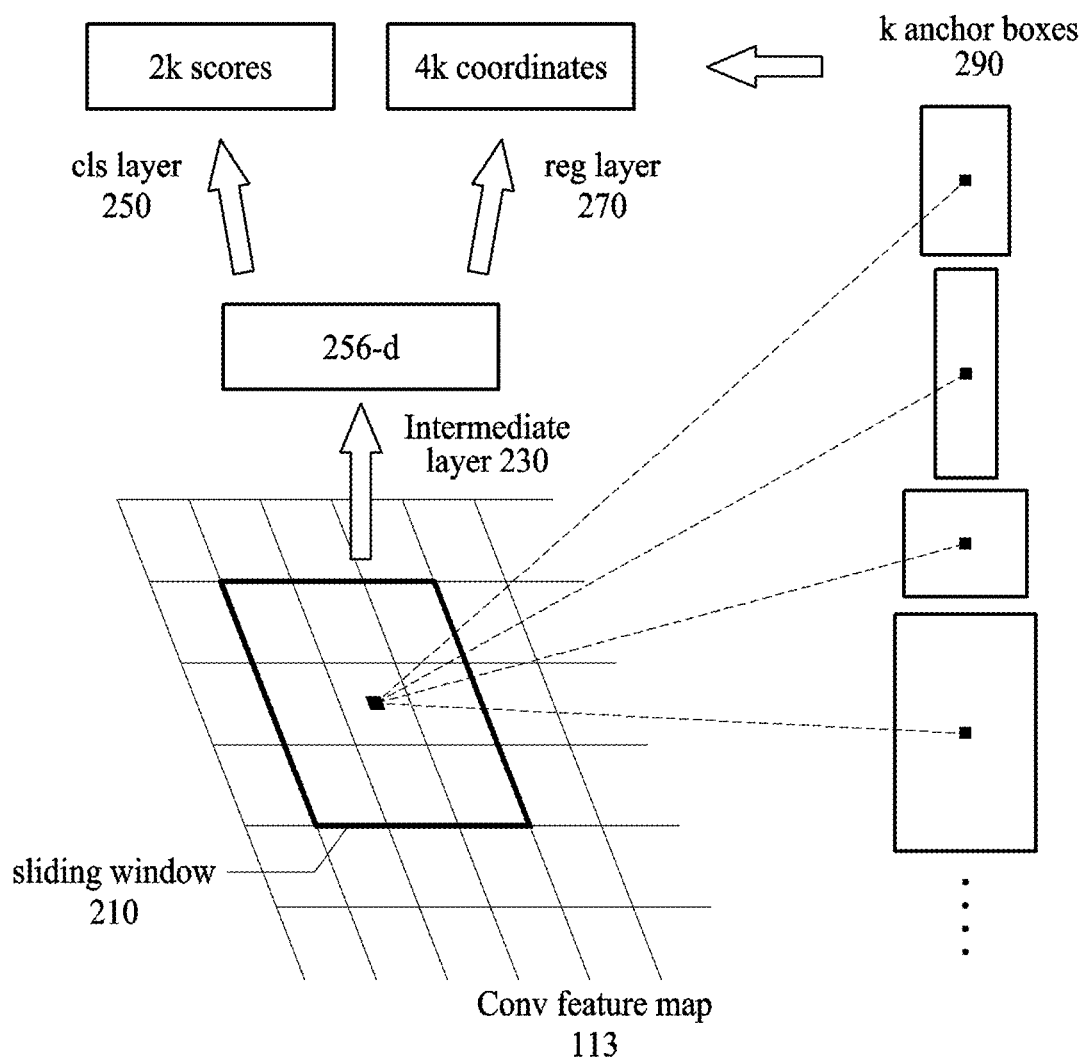
FIG. 2 is a diagram illustrating an example of an operation of a region proposal network (RPN).

FIG. 2 illustrates an example of an operation of the RPN 115. Referring to FIG. 2, in the RPN 115, a size of an input image is not limited, and an output is a set of rectangular objects, each with an "objectness score," for each object candidate region. The "objectness score" corresponds to a probability (for example, 0.98 or 0.86) that an object of interest exists in a corresponding region. A model of the RPN 115 is, for example, in a form of a fully convolutional network.

The RPN 115 receives, as an input, a feature map 113 of a CNN including convolutional layers, performs a convolution operation by an intermediate layer 230 using a sliding window 210 with a size of "n×n," and generates a 256-dimensional (or 512-dimensional) feature vector. The 256-dimensional feature vector is applied to each of a classification (cls) layer 250 and a regression (reg) layer 270. The cls layer 250 indicates whether 256-dimensional feature vectors represent an object through a box classification. The reg layer 270 generates coordinates of object candidate regions corresponding to 256-dimensional feature vectors.

For example, the cls layer 250 obtains an objectness score indicating whether each of "k" object candidate regions corresponds to an object. Accordingly, an output value of the cls layer 250 is "2 k scores." Also, the reg layer 270 outputs four coordinate values (X, Y, W, H) of each object candidate region. Accordingly, an output value of the reg layer 270 is "4 k coordinates."

Depending on examples, a total of "k" object candidate regions are recommended for each sliding window 210. The total of "k" object candidate regions recommended for each sliding window 210 correspond to combinations (for example, "k" anchor boxes 290) in which a scale and an aspect ratio of the sliding window 210 varies based on a center of the sliding window 210.

Figure 3:
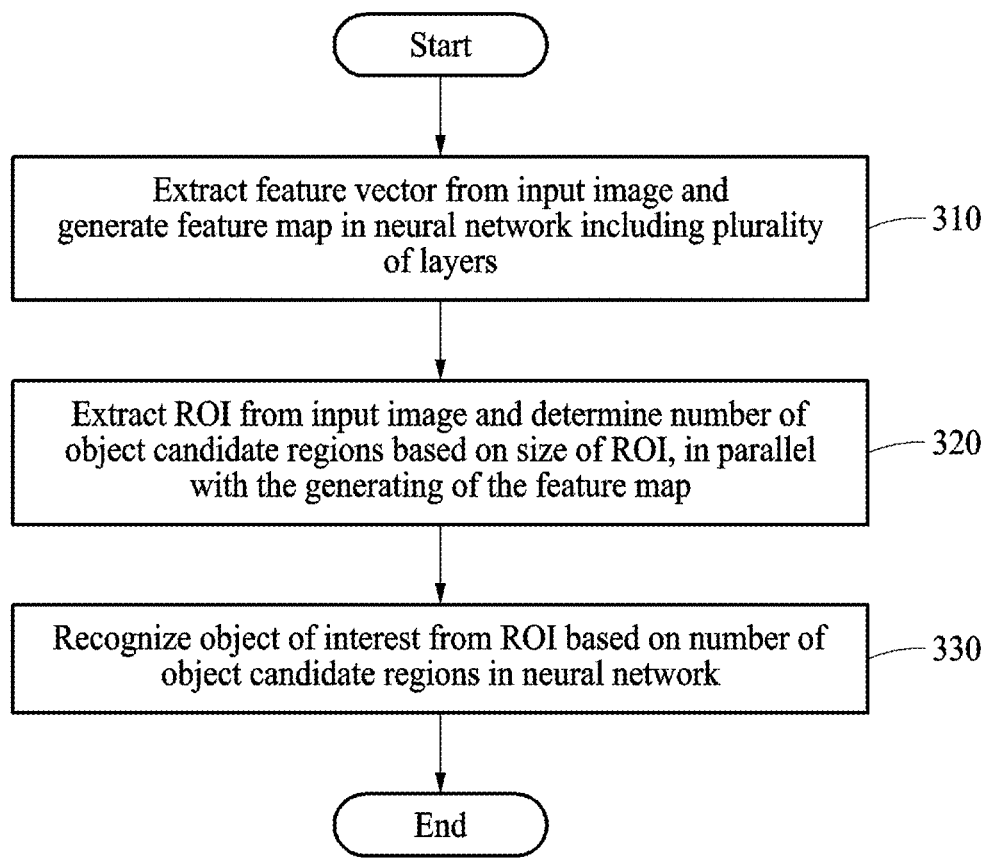
FIGS. 3 and 4 are diagrams illustrating examples of a process of performing operations of an object recognition method in parallel.

FIG. 3 illustrates an example of an object recognition method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, an object recognition apparatus extracts a feature vector from an input image and generates a feature map in a neural network. The neural network includes a plurality of layers. For example, the neural network includes an R-CNN including an RPN and a detection network.

In operation 320, in parallel with the generating of the feature map in operation 310, the object recognition apparatus extracts, using a processor, an ROI, and determines a number of object candidate regions. Operations performed in parallel with the generating of the feature map will be further described below with reference to FIG. 4. In operation 320, the object recognition apparatus extracts an ROI corresponding to at least one object of interest from the input image. The object of interest includes objects such as, for example, a road, a vehicle, a human, an animal, a plant, or a building. Also, the ROI is, for example, a region corresponding to a road, a vehicle, a human, an animal, a plant and a building. In an example, the object recognition apparatus uses a training-based scene segmentation algorithm and an image processing algorithm to extract an ROI.

In operation 320, the object recognition apparatus determines, based on a size of the ROI, a number of object candidate regions that are used to detect an object of interest. For example, the object recognition apparatus determines the number of object candidate regions based on the size of the ROI and a size of the input image. The object recognition apparatus calculates a ratio of the size of the ROI (denoted by Road Area) to the size of the input image (denoted by Input Image Area) and determines the number of object candidate regions based on the calculated ratio, as shown in Equation 1 below.

$$\text{New Number of Proposals} = \text{Default Number of Proposals} \times \frac{\text{Road Area}}{\text{Input Image Area}} \qquad \text{[Equation 1]}$$

In operation 330, the object recognition apparatus recognizes the object of interest based on the number of object candidate regions determined in operation 320. In an example, the object recognition apparatus determines positions of the object candidate regions on the feature map output from the neural network. For example, the object recognition apparatus determines a position, i.e., coordinates of an object candidate region using the above-described RPN. The object recognition apparatus recognizes the object of interest from the ROI based on the position of the object candidate region.

In an example, when the object of interest is recognized, only the extracted ROI (for example, a road region) is used, instead of all regions of the input image. Thus, a number of object candidate regions are reduced, and an amount of time for object recognition is greatly reduced.

In an example, the object recognition apparatus determines a control parameter used to control a speed of a vehicle and a traveling direction of the vehicle based on an object recognition result of operation 330, and controls the movement of the vehicle using the control parameter.

Figure 4:
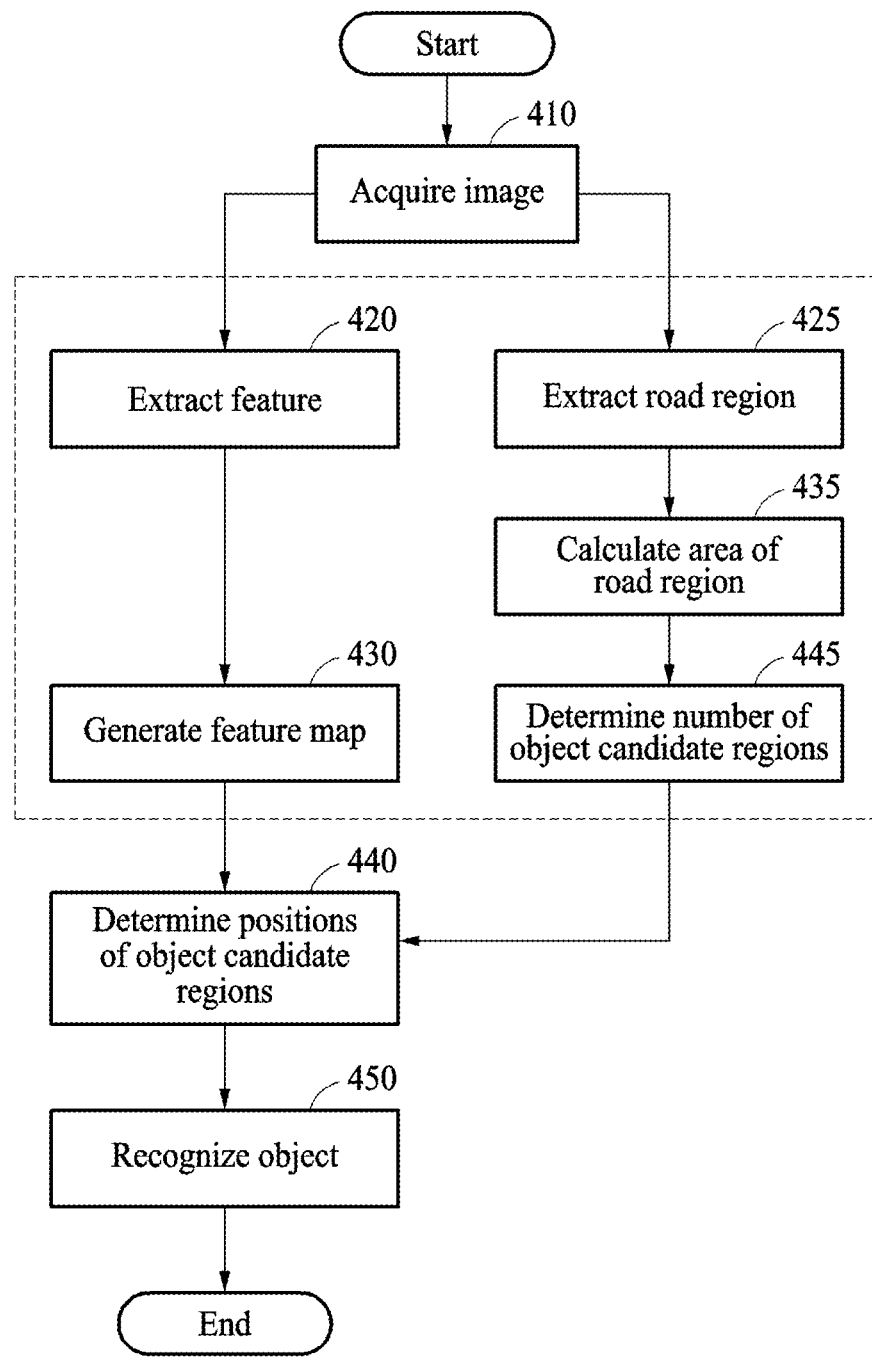

FIG. 4 illustrates an example of a process of performing operations of an object recognition method in parallel. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in an example, operations 420, 430, 440 and 450 are performed in a neural network of an object recognition apparatus, and operations 425, 435 and 445 are performed by a processor of the object recognition apparatus. In an example, the dashed lines enclosing operations 420, 425, 430, 435 and 445 in FIG. 4 correspond to operations that are performed in parallel in the neural network and the processor.

In operation 410, the object recognition apparatus acquires an input image from an image sensor. The object recognition apparatus provides the input image to the neural network and the processor.

In operation 420, the neural network extracts a feature from the input image. In operation 430, the neural network generates a feature map based on the extracted feature. In parallel with operations 420 and 430, in operation 425, the processor extracts an ROI (for example, a road region) corresponding to an object of interest from the input image. In an example, the object recognition apparatus detects an ROI (for example, a road region) including an object of interest (for example, a road) using a separate neural network that is trained to detect the object of interest. In this example, the separate neural network is a neural network trained to detect an ROI including a feature portion of an object of interest together with the object of interest. In another example, the object recognition apparatus detects an ROI (for example, a road region) based on sensor information acquired using a light detection and ranging (LiDAR) sensor as well as an external image captured by a camera or an image sensor. In an example, the sensor information includes, for example, depth information indicating a distance to an object of interest detected from an external image.

In operation 435, the processor calculates a ratio of the size of the extracted road region to the size of the input image. The ratio is calculated based on, for example, an area of the road region to an area of the input image as described above in Equation 1. For example, it is assumed that the input image has a size of 100 mm$^2$, that the road region in the input image has a size of 25 mm$^2$, and that "20" object candidate regions for the input image are set as a default in the neural network. In this example, the area of the road region corresponds to 25% of the size of the input image. In operation 445, the processor determines a number of object candidate regions by multiplying a ratio (for example, 25%) of the area of the road region to the size of the input image by a number (for example, "20") of object candidate regions for the input image that is set as a default in the neural network. For example, "5" object candidate regions are determined by multiplying a ratio of 25% and "20."

In an example, the processor stores, in advance in a form of a lookup table, the number of object candidate regions determined based on the ratio of the size of the road region to the size of the input image. For example, when the area of the road region is calculated, the processor determines the number of object candidate regions based on the lookup table. The processor transfers the number of object candidate regions to the neural network.

In operation 440, the neural network determines positions of the object candidate regions on the feature map generated in operation 430, in response to receiving the number of object candidate regions determined in operation 445.

In operation 450, the neural network recognizes an object of interest from the ROI based on the positions of the object candidate regions. Thus, the neural network recognizes the object of interest from the ROI rather than the entire region of the input image, and reduces the time for object recognition.

Figure 5:
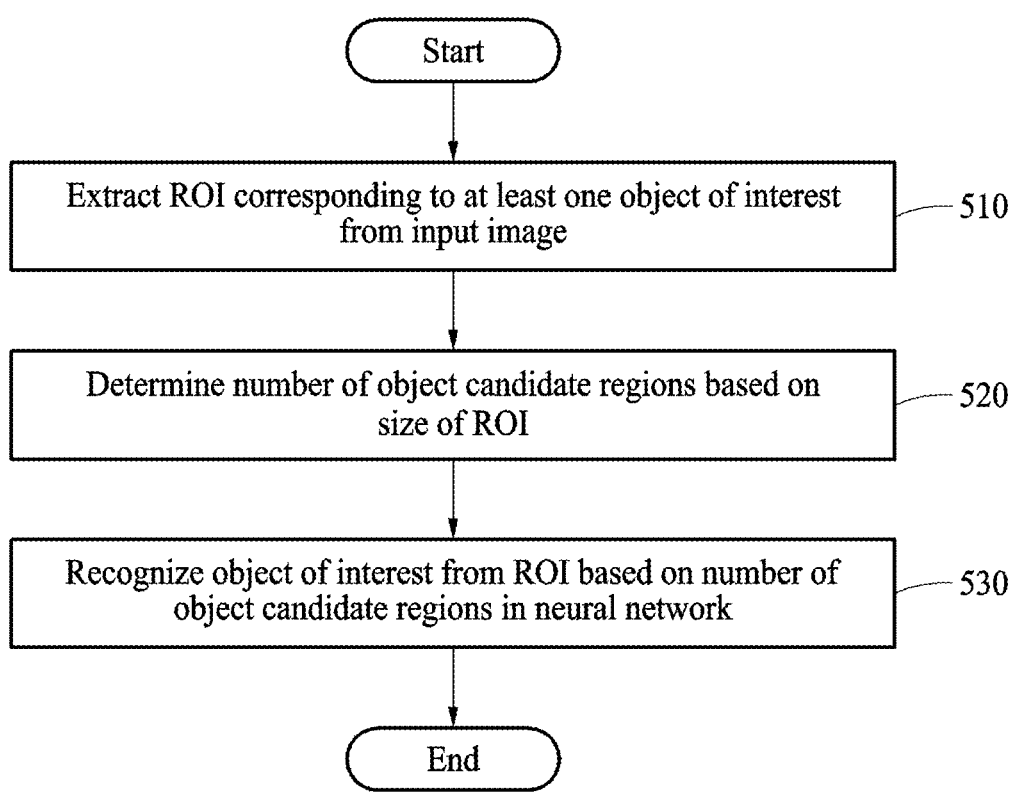
FIGS. 5 and 6 are diagrams illustrating examples of a process of sequentially performing operations of an object recognition method.

FIG. 5 illustrates another example of an object recognition method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, an object recognition apparatus extracts an ROI corresponding to at least one object of interest from an input image. For example, the object recognition apparatus extracts the ROI using any one or any combination of a training-based scene segmentation algorithm and an image processing algorithm. The object of interest includes, for example, a road, a vehicle, a human, an animal, a plant or a building. Also, the ROI is, for example, a region corresponding to a road, a vehicle, a human, an animal, a plant and a building.

In operation 520, the object recognition apparatus determines a number of object candidate regions that are used to detect the object of interest based on a size of the ROI. For example, the object recognition apparatus calculates a ratio of the size of the ROI to a size of the input image and determines a number of object candidate regions based on the calculated ratio as described above in Equation 1.

In operation 530, the object recognition apparatus recognizes the object of interest from the ROI based on the number of object candidate regions in a neural network. For example, the object recognition apparatus determines positions of the object candidate regions on a feature map generated in the neural network, based on the determined number of object candidate regions. The object recognition apparatus recognizes the object of interest from the ROI based on the positions of the object candidate regions. The neural network includes, for example, an R-CNN including an RPN and a detection network.

The object recognition apparatus determines a control parameter used to control a speed of a vehicle and a traveling direction of the vehicle based on an object recognition result, and controls the movement of the vehicle using the control parameter.

Figure 6:
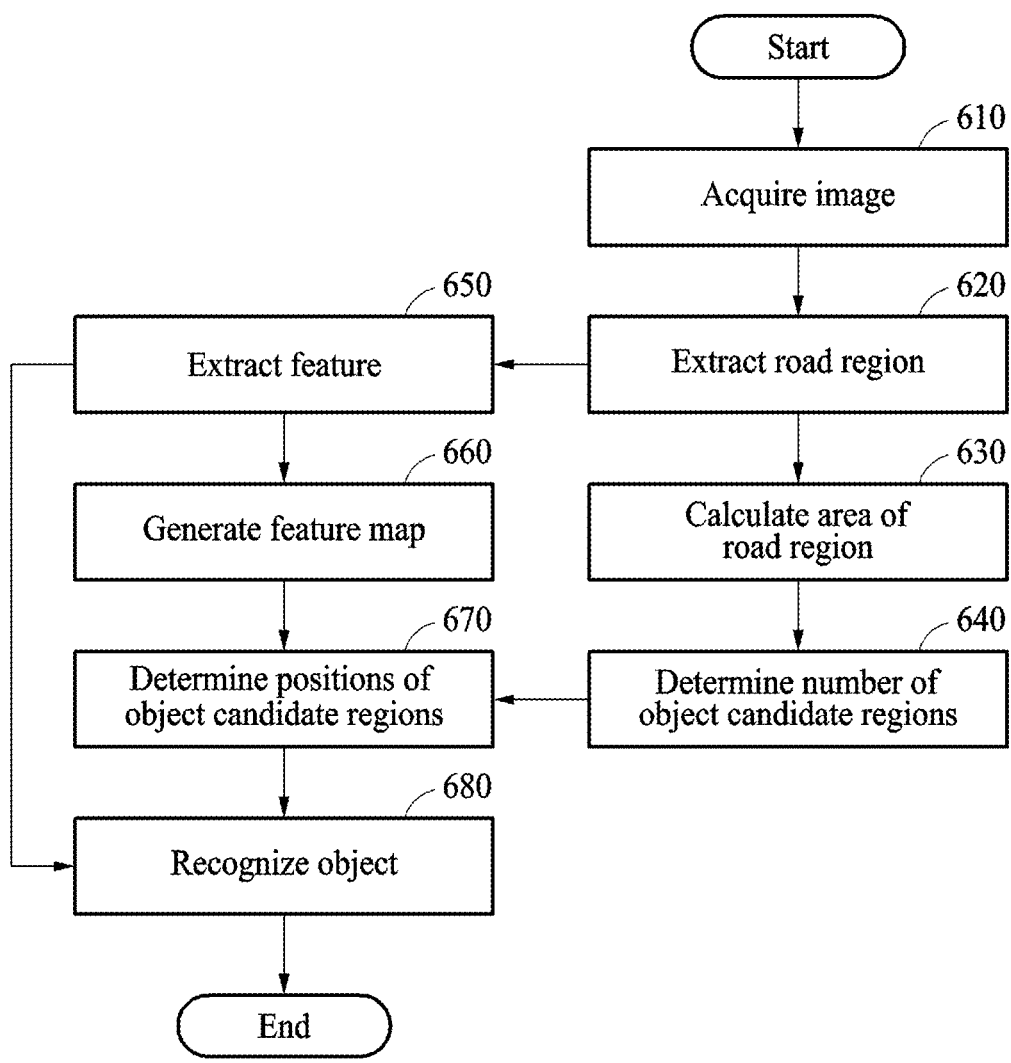

FIG. 6 illustrates an example of a process of sequentially performing operations of an object recognition method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in an example, operations 610, 620, 630 and 640 are performed by a processor of an object recognition apparatus, and operations 650, 660, 670 and 680 are performed by a neural network of the object recognition apparatus.

In operation 610, the object recognition apparatus acquires an input image from a camera or an image sensor. The object recognition apparatus provides the input image to the processor.

In operation 620, the processor extracts an ROI (for example, a road region) corresponding to an object of interest from the input image. The processor transfers the input image and information about the extracted road region to the neural network. In operation 650, the neural network extracts a feature from the input image based on the information about the road region. In operation 660, the neural network generates a feature map based on the extracted feature.

In an example, the object recognition apparatus detects an ROI (for example, a road region) including an object of interest (for example, a road) using a separate neural network that is trained to detect the object of interest. In this example, the separate neural network is a neural network trained to detect an ROI including a feature portion of an object of interest together with the object of interest. In an example, the object recognition apparatus detects an ROI (for example, a road region) based on sensor information acquired using a LiDAR sensor as well as an external image captured by a camera or an image sensor. In this example, the sensor information includes, for example, depth information indicating a distance to an object of interest detected from an external image.

In operation 630, the processor calculates a ratio of the size of the extracted road region to the size of the input image. The ratio is calculated based on, for example, an area of the road region to an area of the input image as described above in Equation 1.

In operation 640, the processor determines a number of object candidate regions by multiplying a ratio calculated in operation 630 by a default number of object candidate regions for the input image set in the neural network.

In operation 670, the neural network determines positions of the object candidate regions on the feature map generated in operation 660 in response to receiving the number of object candidate regions determined in operation 640 from the processor.

In operation 680, the neural network recognizes the object of interest from the ROI based on the positions of the object candidate regions.

Figure 7:
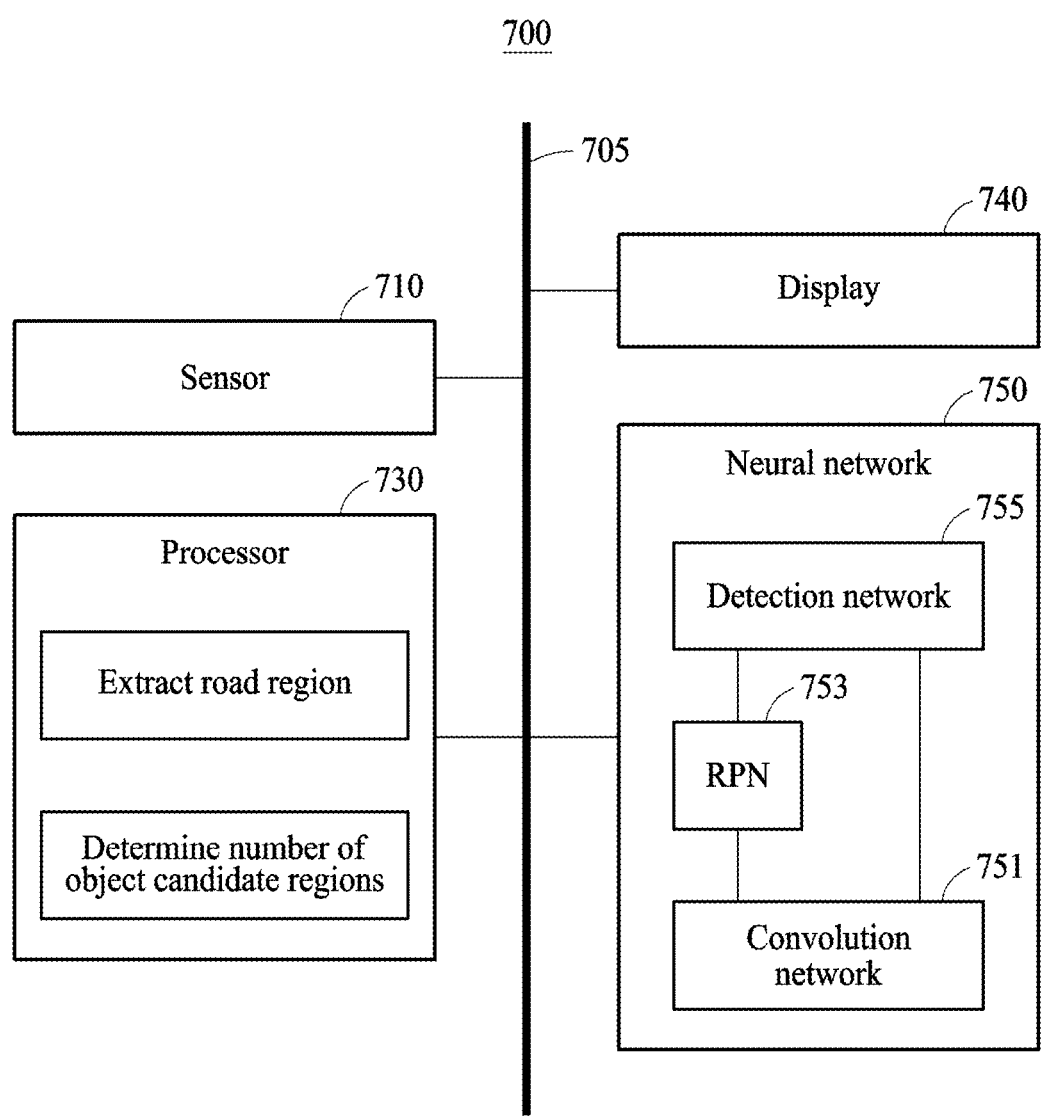
FIG. 7 is a diagram illustrating an example of an object recognition apparatus.

FIG. 7 illustrates an example of an object recognition apparatus 700. Referring to FIG. 7, the object recognition apparatus 700 includes a sensor 710, a processor 730, a neural network 750, and a display 740. The sensor 710, the processor 730, the neural network 750, and the display 740 communicate with each other via a communication bus 705. The object recognition apparatus 700 further includes a memory (not shown).

The sensor 710 acquires an input image. The sensor 710 includes, for example, an image sensor or a LiDAR sensor. A single sensor 710, or a plurality of sensors 710 may be provided.

The processor 730 extracts an ROI corresponding to at least one object of interest, in parallel with a generation of a feature map in the neural network 750. Also, the processor 730 determines, based on a size of the ROI, a number of object candidate regions that are used to detect an object of interest. The processor 730 calculates a ratio of the size of the ROI to a size of the input image and determines the number of object candidate regions based on the calculated ratio.

The neural network 750 is, for example, a faster R-CNN. In an example, the neural network 750 includes a convolution network 751, an RPN 753, and a detection network 755. The convolution network 751 extracts a feature from an input image and generates a feature map. The convolution network 751 includes a plurality of convolutional layers. The RPN 753 determines an object candidate region for all regions of an input image. A number of determined object candidate regions correspond to a default value. The detection network 755 recognizes an object of interest from an ROI based on the number of object candidate regions. The convolution network 751, the RPN 753 and the detection network 755, respectively, correspond to the CNN 111, the RPN 115 and the detection network that includes the ROI pooling layer 117 and the classifier 119 of FIG. 1, and accordingly the above description of FIG. 1 is applicable to an operation of each of the convolution network 751, the RPN 753 and the detection network 755.

In an example, the object recognized by the object recognition apparatus 700 is output to a display 740. In an example, the object recognition apparatus 700 displays the object on a windshield glass of the vehicle through a head-up display (HUD). However, the displaying of the position is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the object recognition apparatus 700 may be used without departing from the spirit and scope of the illustrative examples described.

The memory stores the input image, and the number of object candidate regions determined by the processor 730. In an example, the memory stores a lookup table in which a number of object candidate regions based on the ratio of the size of the ROI to the size of the input image are stored in advance. The memory is, for example, a volatile memory or a nonvolatile memory. Further description of the memory is provided below.

For example, the processor 730 extracts an ROI corresponding to at least one object of interest from the input image, and determines, based on the size of the ROI, a number of object candidate regions that are used to detect the object of interest. In this example, the neural network 750 includes a plurality of layers configured to recognize the object of interest from the ROI based on the number of object candidate regions.

In an example, the processor 730 and the neural network 750 perform at least one of the methods described above with reference to FIGS. 1 through 6, or an algorithm corresponding to at least one of the methods. The processor 730 and the neural network 750 execute a program and control the object recognition apparatus 700. Program codes executed by the processor 730 and the neural network 750 are stored in the memory.

The object recognition apparatus 700, the neural network 750, other apparatuses, units, modules, devices, and components described herein with respect to FIGS. 1, 2 and 7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 through 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object recognition method comprising:
   extracting, in a neural network, a feature from an input image and generating a feature map;
   extracting, in parallel with the generating of the feature map, a region of interest (ROI) corresponding to an object of interest from the input image;
   determining a number of object candidate regions used to detect the object of interest based on a size of the ROI and a size of the input image; and
   recognizing the object of interest from the ROI based on the number of object candidate regions in the neural network.

2. The object recognition method of claim 1, wherein the object of interest comprises any one or any combination of a road, a vehicle, a human, an animal, a plant, and a building.

3. The object recognition method of claim 1, wherein the determining of the number of object candidate regions comprises:
   calculating a ratio of the size of the ROI to the size of the input image; and
   determining the number of object candidate regions based on the ratio.

4. The object recognition method of claim 1, wherein the recognizing of the object of interest comprises:
   determining positions of the object candidate regions on the feature map; and recognizing the object of interest from the ROI based on the positions of the object candidate regions.

5. The object recognition method of claim 1, wherein the extracting of the ROI comprises extracting the ROI based on any one or any combination of a training-based scene segmentation algorithm and an image processing algorithm.

6. The object recognition method of claim 1, wherein the neural network comprises a region-based convolutional neural network (R-CNN) comprising a region proposal network (RPN) and a detection network.

7. The object recognition method of claim 1, further comprising:
   determining a control parameter to control a speed of a vehicle and a traveling direction of the vehicle based on a result of the recognizing; and
   controlling a movement of the vehicle using the control parameter.

8. The object recognition method of claim 1, wherein the determining of the number of the object candidate regions comprises:
   calculating a ratio of the size of the ROI to the size of the input image; and
   determining the number of object candidate regions based on applying a number of default object candidate regions for the neural network to the ratio.

9. The object recognition method of claim 1, wherein the ROI comprises a region corresponding to one or any combination of a road, a vehicle, a human, an animal, a plant, and a building.

10. A non-transitory computer-readable storage medium storing instructions that, when executed by a processor, cause the processor to perform the method of claim 1.

11. An object recognition method comprising:
    extracting a region of interest (ROI) corresponding to an object of interest from an input image;
    determining, based on a size of the ROI and a size of the input image, a number of object candidate regions used to detect the object of interest; and
    recognizing, in a neural network, the object of interest from the ROI based on the number of object candidate regions.

12. The object recognition method of claim 11, wherein the object of interest comprises any one or any combination of a road, a vehicle, a human, an animal, a plant and a building.

13. The object recognition method of claim 11, wherein the determining of the number of object candidate regions comprises:
    calculating a ratio of the size of the ROI to the size of the input image; and
    determining the number of object candidate regions based on the ratio.

14. The object recognition method of claim 11, wherein the recognizing of the object of interest comprises:
    determining positions of the object candidate regions on a feature map generated in the neural network, based on the number of object candidate regions; and
    recognizing the object of interest from the ROI based on the positions of the object candidate regions.

15. The object recognition method of claim 11, wherein the extracting of the ROI comprises extracting the ROI based on any one or any combination of a training-based scene segmentation algorithm and an image processing algorithm.

16. The object recognition method of claim 11, wherein the neural network comprises a region-based convolutional neural network (R-CNN) comprising a region proposal network (RPN) and a detection network.

17. The object recognition method of claim 11, further comprising:
    determining a control parameter used to control a speed of a vehicle and a traveling direction of the vehicle based on a result of the recognizing; and
    controlling a movement of the vehicle using the control parameter.

18. A non-transitory computer-readable storage medium storing instructions that, when executed by a processor, cause the processor to perform the method of claim 11.

19. An object recognition apparatus comprising:
    a sensor configured to acquire an input image;
    a neural network, comprising a plurality of layers, configured to extract a feature from the input image and to generate a feature map; and
    a processor configured to extract, in parallel with a generation of the feature map, a region of interest (ROI) corresponding to an object of interest from the input image, and to determine, based on a size of the ROI and a size of the input image, a number of object candidate regions used to detect the object of interest,
    wherein the neural network is further configured to recognize the object of interest from the ROI based on the number of object candidate regions.

20. The object recognition apparatus of claim 19, wherein the processor is further configured to calculate a ratio of the size of the ROI to the size of the input image and to determine the number of object candidate regions based on the ratio.

21. An object recognition apparatus comprising:
    a sensor configured to acquire an input image;
    a processor configured to extract a region of interest (ROI) corresponding to an object of interest from the input image and to determine, based on a size of the ROI and a size of the input image, a number of object candidate regions used to detect the object of interest; and
    a neural network, comprising a plurality of layers, configured to recognize the object of interest from the ROI based on the number of object candidate regions.

22. An object recognition apparatus comprising:
    a sensor configured to capture an image; and
    a processor configured to
       extract a region of interest (ROI) corresponding to an object of interest from the image,
       calculate a ratio of a size of the ROI to a size of the image,
       determine a number of object candidate regions used to detect the object of interest based on the ratio; and
    a neural network configured to
       extract a feature from the image and to generate a feature map, and
       recognize the object of interest from the ROI based on the number of object candidate regions and the feature map.

23. The object recognition method of claim 22, wherein the processor is further configured to determine a control parameter to control a speed of the vehicle and a traveling direction of the vehicle based on the recognized object.

* * * * *